Feb. 26, 1929.
W. K. HOWE ET AL
POWER OPERATED CONTROL APPARATUS
FOR TRAFFIC CONTROLLING SYSTEMS
Filed March 18, 1927
1,703,822
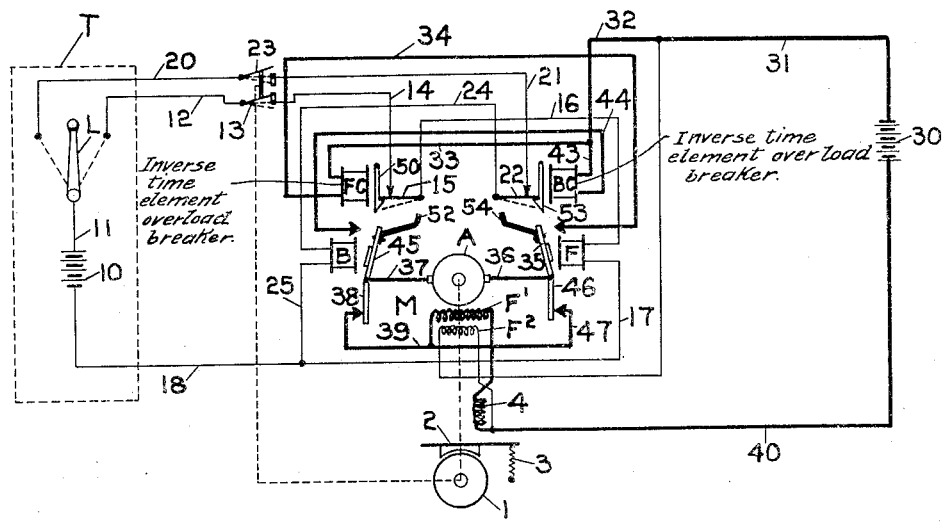
Inventors
W. K. Howe, and
N. C. L. Brown,
By Neil D. Preston,
their Attorney Patented Feb. 26, 1929.

1,703,822

UNITED STATES PATENT OFFICE.

WINTHROP K. HOWE, OF ROCHESTER, AND NED C. L. BROWN, OF SCOTTSVILLE, NEW YORK, ASSIGNORS TO GENERAL RAILWAY SIGNAL COMPANY, OF ROCHESTER, NEW YORK.

POWER-OPERATED CONTROL APPARATUS FOR TRAFFIC-CONTROLLING SYSTEMS.

Application filed March 18, 1927. Serial No. 176,526.

This invention relates to power operated control apparatus for traffic controlling systems, and more particularly to control apparatus for reversible motors controlled from a distant point, such as motors used for operating car retarders and switch machines.

Motors for operating car retarders and switch machines are usually reversible, that is, are connected for operation in either direction and are often operated from a source of electric current supply local to the motor, and are controlled by a local electrically operated controller which in turn is controlled from a distant tower. Motors of the kind mentioned are sometimes considerably overloaded and sometimes have short circuits develop therein so that suitable current cut-out mechanism should be provided to protect the motor and the source of current for supplying the same. Since in a motor control system of this kind a safety cut-out device if used would naturally be located in the local motor circuit, that is, would at least be controlled by the current flow in such local motor circuit, this cut-out device would obviously be located near the motor. Consequently if such cut-out device has functioned to open the motor circuit, means should be available for reclosing the circuit and reinstating the cut-out device for future protection of the reversible motor.

With the foregoing and other important considerations in mind it is proposed in accordance with the present invention to provide two independent cut-out devices, one of which is used only when the motor is operated in one direction and the other of which is only used when the motor is operated in the other direction; and it is further proposed to provide suitable means whereby if the motor is operated in one direction the cut-out device for reverse operation is cut back into service if for any reason it is not in its normal circuit closing condition at the time, and vice versa operation of the motor in the reverse direction will restore the normal running cut-out device. More specifically it is proposed to provide two control relays controlled from a distant point for operating the motor in the forward and reverse direction respectively, and to provide two cut-out devices one of which is capable of opening the forward running motor circuit and the other of which is capable of opening the reverse running motor circuit, and these control relays and cut-out devices are to be so mechanically interconnected that energization of the forward operating control relay will restore the cut-out device in the reverse operating circuit, and conversely the reverse running control relay when energized will restore to normal the cut-out device in the forward running motor circuit; so that, if the motor is operated forwardly the reverse running cut-out device is restored to normal, if not already normal, and if the motor is operated in a reverse direction the forward running cut-out device is restored, if not already in its normal condition.

Other objects, purposes and characteristic features of the invention will in part be apparent from the following detailed description thereof and will in part be obvious from the drawings.

In describing the invention in detail reference will be made to the accompanying single drawing in which the invention has been shown applied to a reversible motor, such as shown in the application to W. K. Howe, Ser. No. 70,599 filed November 21, 1925, or as shown in the patent to W. K. Howe No. 1,288,595 dated December 24, 1918.

In the conventional circuit arrangement shown the motor M having an armature A, a series field winding $F^1$, and a shunt field winding $F^2$, is connected in a circuit arrangement contemplated for operating car retarders to any one of a large number of positions as more specifically shown in the application to Winthrop K. Howe above referred to. In the simplified circuit arrangement shown in the present specification the motor can only be operated to two positions and be automatically stopped, as is true of the switch machine shown in the above mentioned Howe patent. This motor is provided with a brake drum 1, which drum is adapted to be braked by a brake shoe 2 urged against the same by a spring 3 when, the series braking coil 4 connected in series with the series field $F^1$, is de-energized. This motor M is controlled from a distant tower T through the medium of two control wires, a common return wire and two control relays, the relay F if energized causing the motor M to be operated in a forward direction and the relay B if energized operating the motor in a reverse direction, as more clearly appears from the operation hereinafter. If desired the motor could of course be controlled by a two wire polarized control circuit controlling a polar or three position relay, which relay would in turn control the relays B and F. These relays F and B are controlled from the tower T by a suitable lever L, which in the particular arrangement shown can apply current to two different control wires only, more control wires can of course be used if the motor and in turn the car retarder or switch machine is to be operated to more than two positions, in a manner as described in the application of Winthrop K. Howe heretofore mentioned. The motor control apparatus includes two cut-out devices or circuit breakers FC and BC, the actuation of the cut-out device or circuit breaker FC being controlled by the forward running motor circuit and opening such circuit in the event the current flow therein is excessive, or continues for an undue period; and the cut-out device BC is connected in the backward running motor circuit and opens such circuit if the current flow, when the motor is running backwards, is excessive or continues for an undue period of time. Having now described the essential component parts of the system shown, it is believed expedient to consider the operation of the system in order to get a thorough understanding of its operating characteristics.

*Operation.*—Let us assume that the motor M and the device that it controls, such as a switch machine or car retarder, is in the normal or backward position, and that it is desired to operate the motor forwardly. To accomplish this the operator at the tower T will move the lever L to the right and complete the following circuit for the forward relay F:—beginning at the battery 10, wire 11, contact of the control lever L, wire 12, contact 13 controlled by the motor mechanism and opened when the motor has been operated to the extreme forward position, wire 14, contact 15 of the forward running protective cut-out device FC, wire 16, winding of the forward operating control relay F, wires 17 and 18, back to the battery 10. With this circuit completed the motor will operate in the forward direction until it has completed its stroke at which time the contact 13 will be shifted to the dotted position. In this connection it is desired to point out that the contact 23 is closed as soon as the motor is operated in the forward direction. In other words, during the main part of each operating stroke all the limit or stopping contacts (such as 13 and 23) are closed, as more clearly described in the application and patent heretofore referred to. The energization of the forward control relay F will close a circuit for the motor M which may be traced as follows: beginning at the terminal of a suitable source of energy such as the battery 30, wires 31, 32 and 33, winding of the forward cut-out device FC, wire 34, contact 35 of the forward running relay F, wire 36, armature A of the motor M, wire 37, back contact 38 of the backward running relay B, wire 39, series field winding $F^1$, electro-magnetic brake winding 4, wire 40 back to the other terminal of the battery 30. With this circuit completed the motor will run in a forward direction, will move contacts 13 and 23 to the middle dotted position and will continue to run until the mechanism operated thereby has completed its operated stroke at which time the contact 13 is shifted to the extreme dotted position, the forward relay F is de-energized and the motor is stopped and braked by de-energization of the brake winding 4, through the medium of the brake drum 1 and brake shoe 2.

If now the operator in the tower T desires to operate the motor M back to the normal position, he will move the lever L to the extreme left hand position and thereby complete a circuit for the backward running control relay B as follows:—beginning at the battery 10, wire 11, contact of the control lever L, wire 20, contact 23, wire 21, circuit breaker contact 22 of the backward running circuit breaker or cut-out device BC, wire 24, winding of the backward running control relay B, wires 25 and 18, back to the battery 10. The completion of this circuit energizes the control relay B and completes the following circuit for running the motor M backwards:—beginning at the battery 30, wires 31, 32 and 43, winding of the backward running cut-out device BC, wire 44, front contact 45 of the backward running control relay B, wire 37, armature A of the motor M, wire 36, back contact 46 of the forward running control relay F, wire 47, series field winding $F^1$ of the motor M, the brake winding 4 of the electro-magnetic brake 1—2, wire 40, back to the battery 30. The completion of this circuit causes the motor to operate in the backward direction and immediately upon its operation the contacts 13 are reclosed so that, if desired, the motor may be again operated forwardly from any intermediate position. When the mechanism controlled by the motor has completed its operating stroke the contact 23 will be operated back to its normal position and will thereby open the control circuit for the control relay B, which in turn causes the backward running motor circuit to be opened.

It should be noted that the shunt winding $F^2$ is connected directly across the battery 30 so that there is always a shunt magnetic field available. Further it should be noted that the armature A of the motor M is short circuited through the following circuit when both of the control relays F and B are deenergized:—beginning at the armature A, wire 36, back contact 46 of the control relay F, wires 47 and 39, back contact 38 of the control relay B, wire 37, back to the armature A. This circuit just traced may include a suitable amount of resistance and constitutes a snubbing circuit for the motor, and the braking action effected by the motor being short circuited through this circuit will help the electro-magnetic brake 1—2 to stop the motor after its operating stroke has been completed.

Let us now consider the cut-out protection features and how the cut-out device or circuit breakers FC and BC may be restored after they have been actuated. Let us assume that the operator in the tower T wishes to operate the motor in a forward direction and that in order to do so he moves the lever L to the extreme right hand position and closes an energizing circuit for the forward running control relay F as heretofore traced. Let us assume that the current drawn by the motor for some reason or other is either excessive, or flows for a longer time than it should under normal conditions, and that this abnormal current flow will cause the forward cut-out device FC to attract its latching armature 50 and in so doing will cause it to unlatch the contact 15 and allow it to drop to the dotted position, thereby opening the energizing circuit for the control relay F, which in turn opens the motor circuit. The operator will of course now be helpless as far as operating the motor in a forward direction is concerned, because he cannot again energize the control relay F the energizing circuit of which is open at the contact 15. Let us assume that the operator by reason of suitable indicating means or for some other reason is aware of the fact that the motor has not yet completed its operating stroke to the forward position and that he wishes to again apply current to the motor to operate it forwardly. In order to do this the operator will momentarily move the lever L to the extreme left hand position. Since the contact 23 has been closed although the contact 13 may not have yet been opened the operator is able to apply current to the backward running control relay B. Let us assume that the operator moves the lever L to the left hand position only momentarily to cause the control relay B to attract its armature and again release the same. This energization of the backward running control relay B causes the insulating arm 52 of the control relay B to engage the contact 15 and restore it to its normal latched position. Obviously, the operator is now again able to apply current to the forward running control relay F to cause the motor to complete its operating stroke. In a similar way, the contact 22 of the backward running cut-out device BC is unlatched due to the attraction of the armature 53 and thus is permitted to drop to its open dotted position, this contact 22 may be restored through the medium of the insulating arm 54 of the forward running control relay F engaging the same upon energization of this relay F in the same manner as already explained in connection with the cut-out device FC.

The cut-out relays FC and BC may be straight overload relays, inverse time element overload relays or may be relays which are actuated if normal current has been flowing for an undue period of time, and have for convenience been shown conventionally, and further may be actuated magnetically or by a thermal device.

There has thus been shown and described an arrangement for controlling reversible motors having cut-out devices located at a point distant from the operator, and has been shown and described means whereby if one or the other of the cut-out devices employed is actuated and opens the motor circuit, this cut-out device may again be restored by means including the same control wires which are used for controlling the motor, so that no additional line circuits connecting the tower and the distant motor need be provided.

Having thus shown and described a single specific embodiment of the invention in which many of the parts have been shown conventionally, it is desired to be understood that this has been done for the purpose of clearly describing the invention and without the intention of showing the specific construction preferably employed in practicing the invention nor is the illustration intended to show the scope of the invention; and it is to be understood that various changes, modifications and additions may be made to adapt the invention to the particular motor control circuit arrangement encountered where the invention is to be practiced all without departing from the scope of the invention or the idea of means underlying the same further than is demanded by the scope of the following claims.

What we claim is:—

1. In combination, a reversible motor having a normal running operating circuit and a reverse running operating circuit, one circuit breaker in said normal circuit, another circuit breaker in said reverse circuit, and means for closing said one circuit breaker when the motor is operated in the reverse direction and for closing said other circuit breaker when the motor is operated in the normal direction.

2. In combination, a reversible motor having a normal running operating circuit and a reverse running operating circuit, one circuit breaker in said normal circuit, another circuit breaker in said reverse circuit, and means for closing said one circuit breaker in response to closure of said reverse operating circuit and for closing said other circuit breaker in response to closure of said normal operating circuit.

3. In combination, a reversible motor having a normal running operating circuit and a reverse running operating circuit, one circuit breaker in said normal circuit, another circuit breaker in said reverse circuit, means for stopping said motor when it has completed a certain cycle of operation, and means for closing said one circuit breaker when the motor is operated in the reverse direction and for closing said other circuit breaker when the motor is operated in the normal direction.

4. In combination, a reversible motor having a normal running operating circuit and a reverse running operating circuit, one circuit breaker in said normal circuit, another circuit breaker in said reverse circuit, means for stopping said motor when it has completed a certain cycle of operation, and means for closing said one circuit breaker in response to closure of said reverse operating circuit and for closing said other circuit breaker in response to closure of said normal operating circuit.

5. In combination, a reversible motor having a normal operating circuit and a reverse operating circuit, a normal relay for closing said normal circuit, a normal cut-out device for opening said normal circuit if the current flow therein is abnormal, a reverse relay for closing said reverse circuit, a reverse cut-out device for opening said reverse circuit if the current flowing therein is abnormal, and means for reclosing said reverse cut-out device when said normal relay is operated and for reclosing said normal cut-out device when said reverse relay is operated.

6. In combination, a reversible motor having a normal operating circuit and a reverse operating circuit, a normal relay for closing said normal circuit, a normal cut-out device for opening said normal circuit if the current flow therein is excessive, a reverse relay for closing said reverse circuit, a reverse cut-out device for opening said reverse circuit if the current flowing therein is excessive, and means for reclosing said reverse cut-out device when said normal relay is operated and for reclosing said normal cut-out device when said reverse relay is operated.

7. In combination, a reversible motor having a normal operating circuit and a reverse operating circuit, a normal relay for closing said normal circuit, a normal cut-out device for opening said normal circuit if the current flow therein continues longer than it should, a reverse relay for closing said reverse circuit, a reverse cut-out device for opening said reverse circuit if the current flowing therein continues longer than it should, and means for reclosing said reverse cut-out device when said normal relay is operated and for reclosing said normal cut-out device when said reverse relay is operated.

8. In combination, a reversible motor having a normal operating circuit and a reverse operating circuit, a normal relay for closing said normal circuit, a normal cut-out device for opening said normal circuit if the current flow therein is excessive, a reverse relay for closing said reverse circuit, a reverse cut-out device for opening said reverse circuit if the current flowing therein is excessive, means for opening said normal circuit when the motor has completed a certain cycle of operation in the normal direction, means for opening said reverse circuit when the motor has completed a certain cycle of operation in the reverse direction, and means for reclosing said reverse cut-out device when said normal relay is operated and for reclosing said normal cut-out device when said reverse relay is operated.

9. In combination, an electric power-operated traffic controlling device having a normal and a reverse operating circuit, a lever located at a point distant to said traffic controlling device for effecting a closure of the normal or the reverse operating circuit at one point, separate overload circuit breaking means at another point in each of said normal and said reverse circuits which circuit breaking means if actuated remain in their actuated condition until restored, means associated with said normal circuit effective upon closure of said normal circuit to restore the circuit breaking means in said reverse circuit, and means associated with said reverse circuit effective upon closure of said reverse circuit to restore the circuit breaking means in said normal circuit.

10. In combination, an electric power-operated traffic controlling device having a normal operating circuit and a reverse operating circuit, a lever located at a point distant to said traffic controlling device for effecting closure of the normal circuit at one point or closure of the reverse circuit at one point, an overload circuit breaker at another point in said normal circuit, a second overload circuit breaker at another point in said reverse circuit, said overload circuit breakers if actuated remaining in their actuated condition until restored, means associated with said normal circuit effective upon closure of said normal circuit to restore the circuit breaker in said reverse circuit, and means associated with said reverse circuit effective upon closure of said reverse circuit to restore the circuit breaker in said normal circuit.

11. In combination, a reversible motor having a normal operating circuit and a reverse operating circuit, a normal relay for closing said normal circuit, a normal cut-out device for opening said normal circuit if the current flow therein is excessive and has been flowing for more than a predetermined time, a reverse relay for closing said reverse circuit, a reverse cut-out device for opening said reverse circuit if the current flowing therein is excessive and has been flowing for more than a predetermined time, and means for reclosing said reverse cut-out device when said normal relay is operated and for reclosing said normal cut-out device when said reverse relay is operated.

In testimony whereof we affix our signatures.

WINTHROP K. HOWE.
NED C. L. BROWN.